United States Patent [19]
Schonemeyer

[11] 3,920,923
[45] Nov. 18, 1975

[54] PATH FINDING AND MARKING CIRCUIT

[75] Inventor: Hilmar Schönemeyer, Hemmingen, Germany

[73] Assignee: International Standard Electric Corporation, New York, N.Y.

[22] Filed: Jan. 28, 1974

[21] Appl. No.: 437,049

[30] Foreign Application Priority Data

Feb. 2, 1973 Germany ............................ 2305227

[52] U.S. Cl. ............................................ 179/18 GF
[51] Int. Cl.² ............................................ H04Q 3/52
[58] Field of Search ........................ 179/18 GF, 18 G

[56] References Cited

UNITED STATES PATENTS

| | | | |
|---|---|---|---|
| 3,531,773 | 9/1970 | Beebe | 179/18 GF X |
| 3,683,117 | 8/1972 | Magnusson et al. | 179/18 GF |
| 3,828,314 | 8/1974 | Bradbery et al. | 340/166 R |

*Primary Examiner*—Thomas W. Brown
*Attorney, Agent, or Firm*—James B. Raden; Delbert P. Warner

[57] ABSTRACT

A switching network for multistage switching systems using IC techniques is proposed in which each switching matrix is self-sufficient, i.e. operates independently during both path finding and marking. This is accomplished by a selection circuit inside each switching matrix which circuit can be easily combined with the other logic elements for passing on offering and catching signals to form an integrated circuit.

8 Claims, 4 Drawing Figures

PATH FINDING AND MARKING CIRCUIT

The present invention relates to a path-finding and marking circuit for multistage switching networks with switching matrices, links, and guide wires.

The task of such a path-finding and marking circuit is to make and mark such a selection from the plurality of switching matrices and links available for a connection through the switching network that finally a switchable connection extending through all connecting stages and with an idle link between every two adjacent connecting stages is accurately determined.

The SEL-Nachrichten 1963, No. 3, pp. 109 to 113, corresponding to "The Guide Wire Method" appearing on pages 15 to 19 of "Quasi-Electronic Telephone Switching System HE-60" published by Standard Electric Lorenz AG, Stuttgart-Zuffenhausen, Germany, describe a path-finding and marking circuit for multistage switching networks with switching matrices, links, and with guide wires on which, in a first step, all links usable for a desired connection are marked by an offering signal transmitted from one side to the other side of the switching network, and on which, in a second step, one out of several offered links is marked as "selected" by a catching signal sent back from the other side to said one side of the switching network.

In that circuit, each connecting stage has a central stage marker which is provided with a selection circuit multipled to all guide wires of the parallel switching matrices. Since, as a rule, multistage switching networks also have a plurality of parallel switching matrices, this involves the risk of a fault on a guide wire having a blocking effect on the stage marker and thus on all possibilities of connection.

The path-finding and marking circuit according to the invention is characterized in that each switching matrix has its own selection circuit, that the selection circuit is combined with the logic elements and amplifiers needed to pass on and block the offering signal and the catching signal into an integrated circuit, and that the crosspoints are marked by the selection circuit individual to the respective switching matrix. This circuit has the advantage that functionally cooperating parts can also be combined from a structural point of view. The need for expensive multiple cablings is avoided. Even if one switching matrix is defective, each subscriber still has restricted possibilities of communication via independent switching matrices. In case of changes in the extent of the switching network no action is necessary in the central control because, in the integrated circuit, the selection circuit is now adapted directly to the number of inlets and outlets of the individual switching matrix and is replaced together with the latter.

An improvement of the circuit according to the invention is characterized in that the guide wires simultaneously serve as holding wires on which a holding signal is returned from the switching-network outlet marked by the passed-through catching signal to the inlet of the switching network on the path marked by the catching signal, which holding signal causes the crosspoints marked in this way to be held during a call and, as it is removed, causes the crosspoint involved to be released at the end of a call. The supplement to the integrated circuits which is necessary for this purpose does not substantially increase the production cost, whereas the savings in crosspoint elements with holding characteristics reduce the cost considerably.

Another improvement of the circuit according to the invention is characterized in that, for path finding and marking, the central control provides only the marking of the suitable inlets and outlets at both sides of the multistage switching network. This considerably reduces the holding time of the central control.

A further improvement of the circuit according to the invention is characterized in that the marking simultaneously identifies a group of inlets and/or outlets if the switching task to be performed permits an alternative selection (e.g. in the case of collective lines or selectively seizable junctors), and that the selection is not effected until the offering signal or the catching signal has successfully passed through the guide-wire network. With the known circuit a multiple path-finding operation must be performed in most cases if the switching task permits alternatives in this respect. In contrast, in the subject matter of the application, the offering signal, for instance, can be applied to the guide wires simultaneously in the case of all junctors coming into question and, therefore, stands a better chance to reach the subscriber side of the switching network on a still idle path at the first attempt.

In a first possiblity, the same guide wire is used as offering, catching, and holding wire. In a second possibility, different guide wires are used as offering, catching, and holding wires. In the first possibility, a larger number of switching elements is needed to separate and properly evaluate the different signals, but this increase in switching elements is less expensive than additional wires.

Another improvement of the circuit according to the invention is characterized in that the integrated circuit simultaneously comprises electronic switching elements as crosspoints of a switching matrix. Thus, there are no problems with soldered joints, and the time intervals for the activation of the switching elements become negligibly small.

In the case of larger switching matrices it may nevertheless be appropriate to have a separate integrated circuit which comprises the circuits for switching through and holding the marked switching elements. The uniform structure of the switching elements and the fact that the signals for through-switching and holding are continuous signals in comparison with the selection operations, make it appear advisable to combine these circuits "switching-matrix-wise".

An embodiment of the invention will now be explained, by way of example, with reference to the accompanying drawings, in which.

Figure 1:
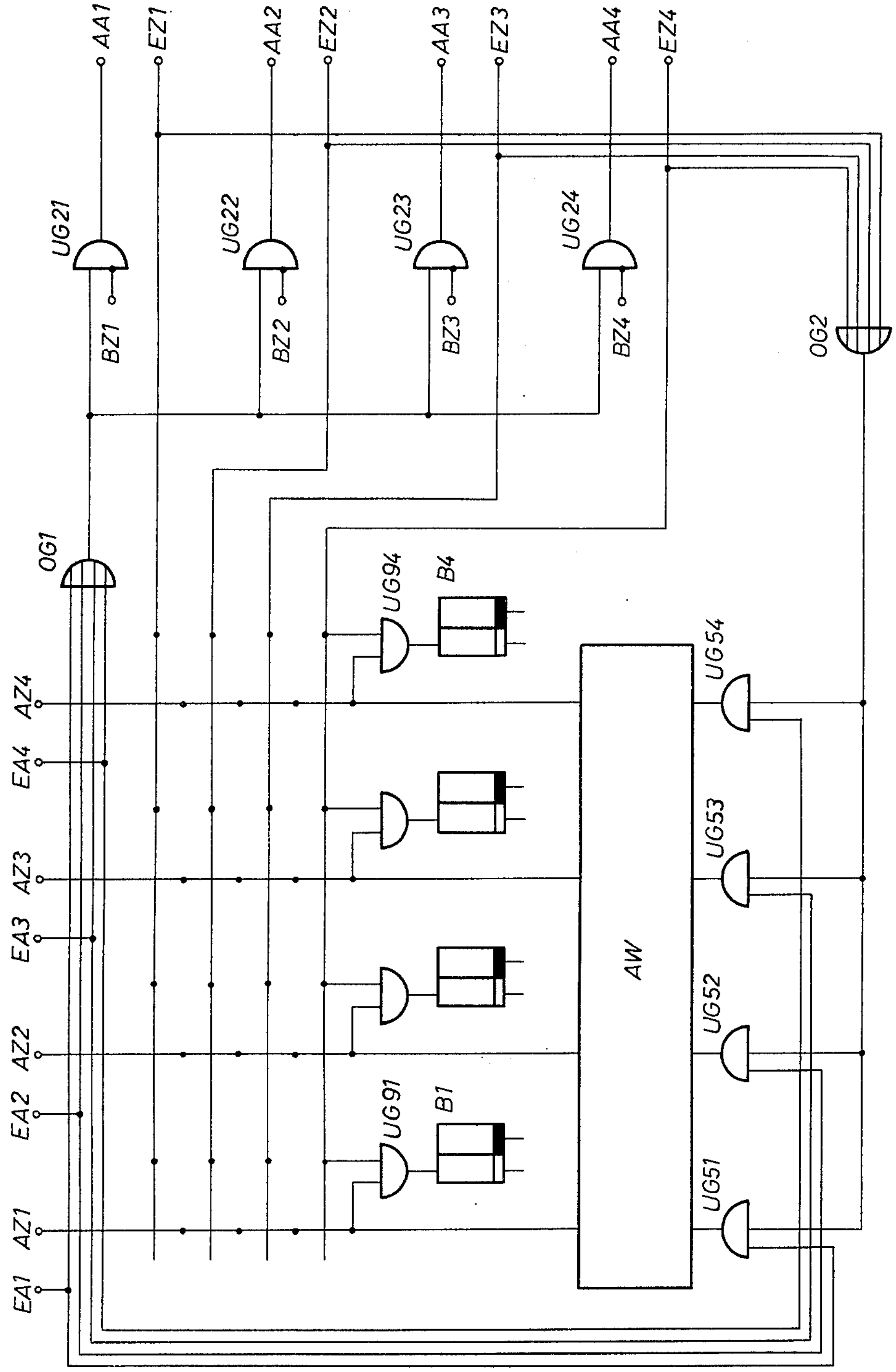
FIG. 1 is a block diagram showing the guide-wire network of a switching matrix.

The guide-wire network of a switching matrix, shown in FIG. 1, requires, for example, a switching matrix with four inlets and four outlets between which connections can be established selectively. Accordingly, there are four offering-signal inlets EA1, EA2, EA3, and EA4, and four offering-signal outlets AA1, AA2, AA3, and AA4. An OR-element OG1 interconnects the four offering-signal inlets EA1 to EA4, thus providing four following AND-elements UG21 to UG24 at the same time with an offering signal applied via any one or more offering-signal inlets. Each of these AND-elements UG21 to UG24 has two inputs. The offering signal is applied via the upper input; via the lower input the AND-element is inhibited when a crosspoint has already been closed in the corresponding row of the switching matrix. For example, a busy signal BZ1 at the AND-element UG21 prevents the offering signal from being passed on to the offering-signal outlet AA1 if a connection already exists via the first row of the switching matrix. Thus, the offering signal is simultaneously transmitted to all offering-signal outlets associated with idle rows of the switching matrix.

The guide-wire network of FIG. 1 also has four catching-signal inlets EZ1, EZ2, EZ3, and EZ4. An OR-element OG2 interconnects the catching-signal inlets EZ1 to EZ4, thus simultaneously providing four following AND-elements UG51, UG52, UG53, and UG54 with a catching signal applied through any one of the catching-signal inlets. Each of these AND-elements UG51 to UG54 has two inputs. The offering signal is applied via the left input, and the catching signal is applied via the right input. Special inhibit inputs are not necessary in the AND-elements UG51 to UG54 because the offering signal can be applied only over the guide wire of an idle link. Thus, if an offering signal is applied, it is certain that no crosspoint of this column of the switching matrix is closed. The catching signal is thus transmitted from the output of the OR-element OG2 to all inputs of a selection circuit AW, whose associated matrix columns (offering-signal inlets EA1 to EA4) receive an offering signal. The function of the selection circuit AW is to select one inlet out of any combination of inlets to which a catching signal is applied, and to pass the catching signal on to the corresponding outlet only. To do this, various principles can be used, such as a self-setting selection circuit. With the aid of FIG. 4 an embodiment will be explained below which is particularly suitable for being combined, in a manner essential to the invention, with the other logic elements of a switching matrix as shown in FIG. 1 into an integrated circuit. The catching signal thus appears at one of the catching-signal outlets AZ1 to AZ4, whose associated offering-signal inlet simultaneously has an offering signal applied thereto.

In FIG. 1 it is indicated that each catching-signal inlet is connected to each catching-signal outlet via an AND-element; of these AND-elements only UG91 to UG94 are shown. Each of these AND-elements controls a symbolically illustrated flip-flop B1 to B4.

Thus, in the case of bistable switching elements, the catching signal can be used directly to switch through the selected crosspoint, while the release operation is effected, in a manner not explained here, by selectively resetting the switching element. However, the flip-flops B1 to B4 may also serve to mark the selected crosspoint, so that the latter can be closed with special through-switching and/or holding instructions after the turning-off of the offering and catching signals.

Figure 2:
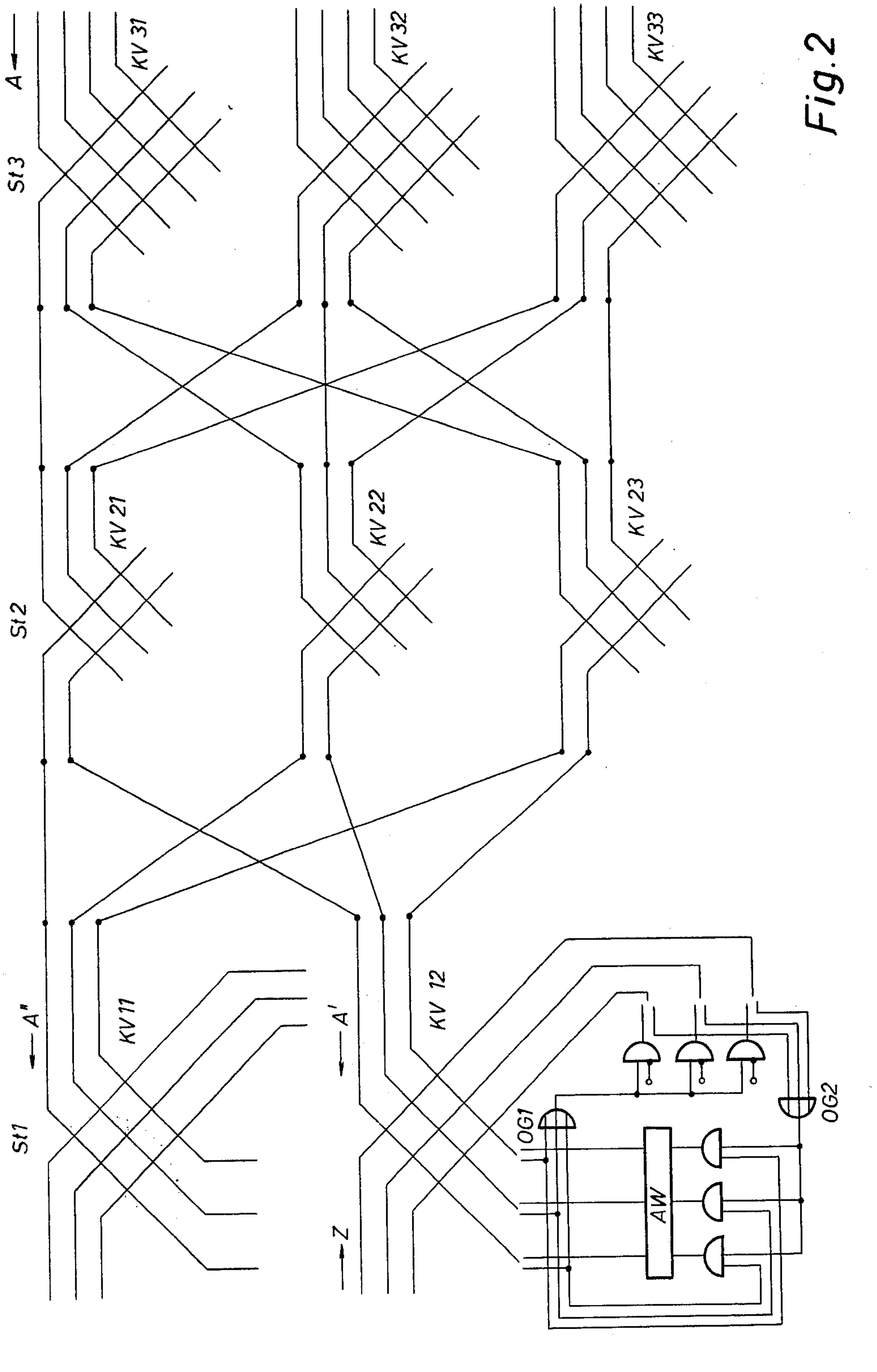
FIG. 2 is a block diagram showing the guide-wire network of a switching network.

In FIG. 2, the guide-wire network of a switching network is distributed among three connecting stages St1, St2, and St3. The connecting stage St1 has two switching matrices KV11 and KV12 with three inlets and three outlets each; the circuits between the inlets and outlets, which circuits correspond to FIG. 1, are indicated only for the switching matrix KV12. The connecting stage St2 has three switching matrices, KV21, KV22, and KV23 with two inlets and three outlets each. The connecting stage St3 has three switching matrices KV31, KV32, and KV33 with three inlets and four outlets each. A comparison between FIG. 1 and the circuit indicated at the switching matrix KV12 of FIG. 2 clearly shows that the underlying principle is independent of the number of inlets and outlets of the respective switching matrix. At the switching matrices of the connecting stages St2 and St3, therefore, the corresponding circuits are not shown for purposes of clarity and simplicity. FIG. 2 is only intended to show that a selection circuit AW inside a switching matrix is in a position to accomplish the tasks within the guide-wire system extending over the entire switching network and independently of other switching matrices.

In a seeking operation chosen by way of example, it is assumed that an offering signal A is applied to the uppermost guide wire of the switching matrix KV31 of the connecting stage St3. This offering signal is transmitted through the switching matrices KV21 and KV22; over one or more guide wires it reaches the switching matrix KV12 as offering signal A′ and the switching matrix KV11 as offering signal A″. In the switching matrix KV12 the offering signal A′ is transmitted, as explained in connection with FIG. 1, via the OR-element OG1 and following AND-circuits onto all idle rows. The same applies analogously to the switching matrix KV11 in respect of the offering signal A″. If the offering signal is transmitted to the left edge of the switching network over several idle paths, a selection is made there within a desired group, and only there is a catching signal Z transmitted onto a single guide wire. This catching signal Z is applied via the OR-element OG2 and following AND-elements to the selection circuit AW. The selection circuit AW passes the catching signal onto only one of the guide wires carrying the offering signal A′. Thus, the catching signal is applied via the switching matrix KV12 to only one switching matrix in the connecting stage St2. No catching signal at all can be applied to the connecting stage St2 via the switching matrix KV11 because none of the AND-elements preceding the selection circuit can be open there. Thus, the initial condition in the connecting stage St2 is the same as in the connecting stage St1, i.e., only one guide wire has a catching signal. Accordingly, only one catching signal is transmitted over guide wire to one switching matrix of the connecting stage St3. Thus, even if the selection is made separately in each switching matrix, only one connection is marked across the entire switching network.

Figure 3:
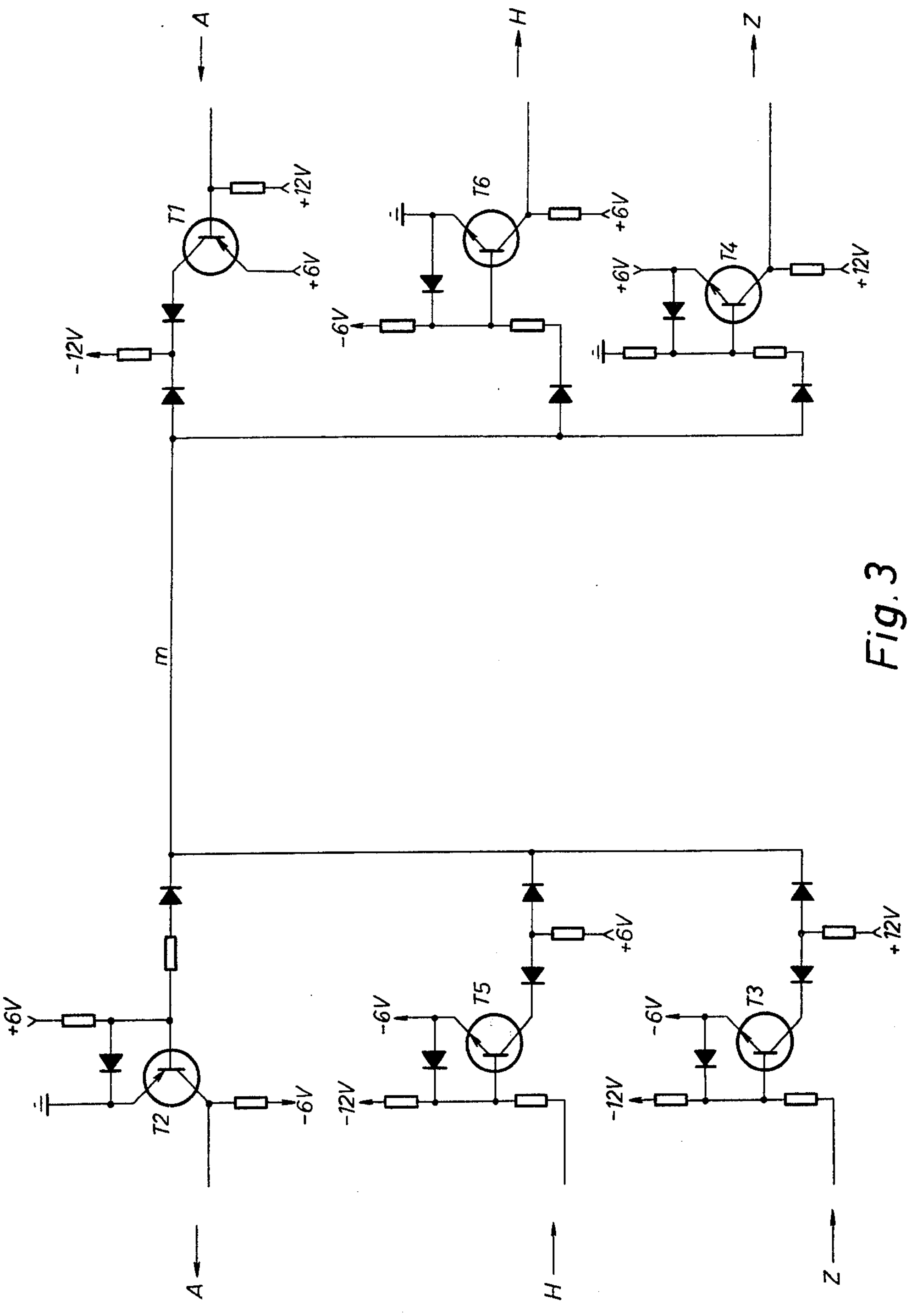
FIG. 3 shows one example of a circuit for evaluating the offering, catching, and holding signals.

In the above description the offering and catching operations were explained irrespective of whether the offering and catching signals are transmitted over one guide wire or over separate guide wires. An example of a circuit will now be explained with the aid of FIG. 3 which circuit permits both offering signals A and catching signals Z and holding signals H to be transmitted over a single guide wire *m* between two switching matrices of neighboring connecting stages in a manner suitable for integrated circuits. This insures that the simplification in the switching matrix does not result in increased complexity in the guide-wire network between the connecting stages. In the example of FIG. 3, the offering signal A is applied as a potential of +12V to the base of transistor T1. Transistor T1 is cut off. At the collector of T1 and thus on the guide wire *m* appears a potential of −12V. The potential of −12V renders transistor T2 conductive, and at the latter's collector appears the offering signal A as a potential of OV, which is converted back into a potential of + 12V in the logic elements within a switching matrix as shown in FIG. 1 before being passed on to a new guide-wire section.

The catching signal Z is applied as a potential of −12V to the base of transistor T3 and, after turning the latter off, appears as a potential of +12V at the collector of T3 and thus on the guide wire m. The potential of +12V is applied to the voltage divider at the base of transistor T4 and is sufficient to render the latter conductive. Thus, the collector potential of transistor T4 drops to about +6V. This potential is passed on as catching signal Z and is converted back to a potential of +12 volts in the logic elements within the switching matrix of FIG. 1.

As holding signal H, a potential of −12V is applied to the voltage divider and thus to the base of transistor T5. This turns transistor T5 off, and a potential of +6V appears at its collector and thus on the guide wire M. The potential of +6V is not able to render transistor T4 conductive because its emitter has already +6V connected thereto. The emitter of transistor T6, however, is connected to ground potential, so that the +6V applied to the voltage divider at the base of transistor T6 render the latter conductive. The holding signal therefore appears as a potential of about 0V at the collector of transistor T6, which potential is converted to a potential of −12V within the switching matrix analogously to the offering and catching signals.

The well-known diode combinations, which are not explained here in detail, prevent the individual potentials of the guide wire *m* from reacting on the transistors not involved.

Figure 4:
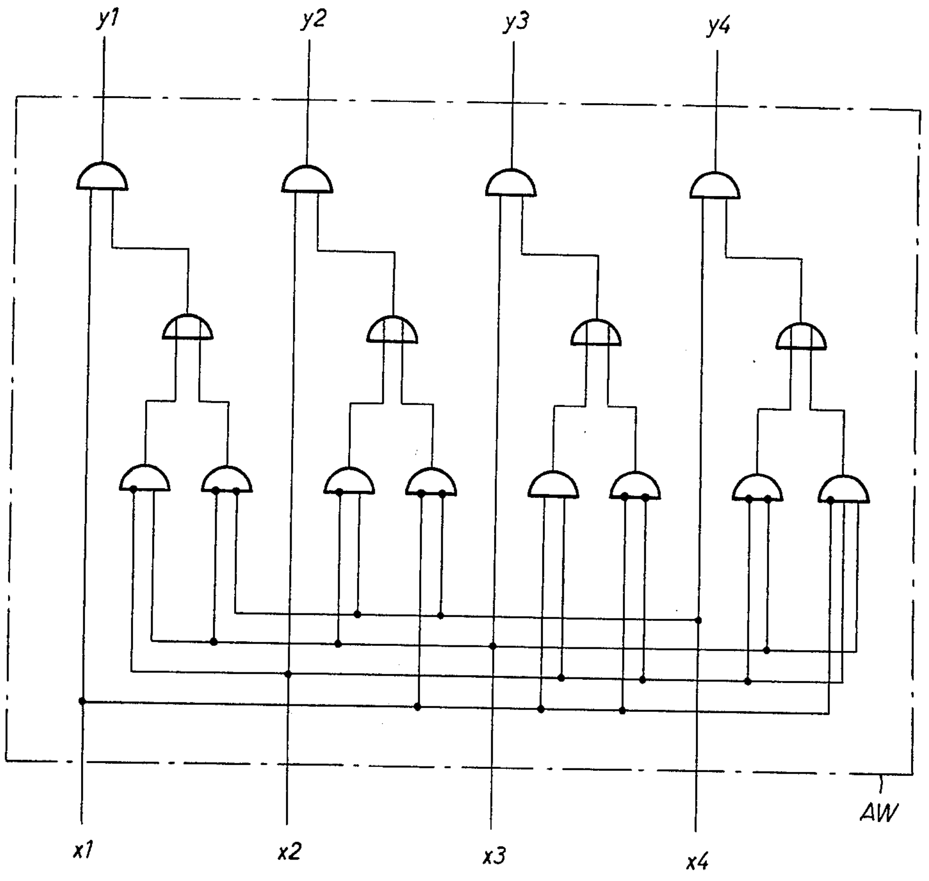
FIG. 4 is a block diagram showing a selection circuit.

FIG. 4 is a block diagram of one embodiment of a selection circuit AW which is suitable for realization using integrated circuit techniques. Like in FIG. 1, a switching matrix with four columns is assumed over whose guide wires the catching signal can be passed on.

This circuit satisfies the following conditions:

$$y1 = x1 + (\bar{x}3 + \bar{x}4)\ v\ (\bar{x}2 + x3)$$
$$y2 = x2 + (\bar{x}3 + x4)\ v\ (\bar{x}1 + \bar{x}4)$$
$$y3 = x3 + (x1 + x2)\ v\ (\bar{x}1 + \bar{x}2)$$
$$y4 = x4 + (\bar{x}2 + \bar{x}3)\ v\ (\bar{x}1 + x2 + x3),$$

where the character + symbolizes the logic function AND, and the character *v* the logic function OR. Those skilled in the art will readily be able to identify the logic elements belonging to the individual terms, so that any more detailed explanation is unnecessary. On the whole, this selection circuit AW satisfies the condition that always only one outlet *y*1 to *y*4 receives a catching signal if a catching signal is applied to the corresponding inlet or to this inlet and additional inlets *x*1 to *x*4.

The above functional conditions reflecting the construction of the selection circuit are obtained directly by combining terms from the following fundamental conditions, which allow for traffic compensation:

$$y1 = (x1 + \bar{x}2 + \bar{x}3 + \bar{x}4)\ v\ (x1 + x2 + \bar{x}3 + \bar{x}4)\ v\ (x1 + \bar{x}2 + x3 + \bar{x}4)\ v\ (x1 + x2 + x3 + x4)$$

$$y2 = (x1 + x2 + \bar{x}3 + x4)\ v\ (\bar{x}1 + x2 + \bar{x}3 + \bar{x}4)\ v\ (\bar{x}1 + x2 + x3 + \bar{x}4)\ v\ (\bar{x}1 + x2 + \bar{x}3 + x4)$$

$$y3 = (\bar{x}1 + \bar{x}2 + x3 + \bar{x}4)\ v\ (\bar{x}1 + \bar{x}2 + x3 + x4)\ v\ (x1 + x2 + x3 + \bar{x}4)\ v\ (x1 + x2 + x3 + x4)$$

$$y4 = (\bar{x}1 + \bar{x}2 + \bar{x}3 + x4)\ v\ (x1 + \bar{x}2 + \bar{x}3 + x4)\ v\ (\bar{x}1 + x2 + x3 + x4).$$

With the knowledge of this relationship it is possible to design corresponding selection circuits for switching matrices with different numbers of columns by first setting up the corresponding fundamental conditions and then deriving therefrom by combination the conditions reflecting the circuit construction.

With the circuit arrangement according to the invention, a so-called self-seeking switching network is obtained whose realization was so far possible only with much more expensive and complex circuits.

What is claimed is:

1. A path-finding and marking circuit for a multistage switching network employing a plurality of switching matrices and links coupled by guide wires over which offering signals and catching signals are applied, each stage of the multi-stage switching network including a switching matrix together with offering signal inlets and outlets and catching signal inlets and outlets, said offering signal inlets and outlets providing access to path means over which, in a first step, all links usable for a desired connection are marked by an offering signal transmitted from an offering signal inlet on one side of a switching matrix to an offering signal outlet on the other side of the switching matrix, and on which, in a second step, one out of several offered links is marked as "selected" by a catching signal sent back from a catching signal inlet on the other side of said switching matrix to a catching signal outlet on said one side of the switching matrix over path means provided through said catching signal inlets and outlets, wherein the improvement comprises a plurality of logic means in each stage coupling respective inlets and outlets to each other and to inlets of the switching matrix, said logic means including a selection circuit coupled to each matrix, said logic means responding to the simultaneous presence of offering and catching signals whereby said selection circuit marks crosspoints in the switching matrix.

2. A circuit according to claim 1, in which the guide wires are employed as holding wires on which a holding signal is returned from the switching-network outlet marked by the passed-through catching signal to the inlet of the switching network on the path marked by the catching signal, said holding signal causing the crosspoints marked in this way to be held during a call and, as it is removed, causing the crosspoints involved to be released at the end of a call.

3. A circuit according to claim 1, in which, for path finding and marking, a central control provides end marking signals for suitable inlets and outlets at both sides of the multistage switching network.

4. A circuit according to claim 3, in which the end marking simultaneously identifies a group of inlets and/or outlets if the switching task to be performed permits an alternative selection (e.g. in the case of collective lines or selectively seizable junctors), and the selection is not made until the offering signal or the catching signal has successfully passed through the guide-wire network.

5. A circuit according to claim 2, in which the same guide wire is used as an offering, catching, and holding wire.

6. A circuit according to claim 2, in which different guide wires are used as offering, catching, and holding wires.

7. A circuit according to claim 1, in which electronic switching elements are employed as crosspoints in each switching matrix.

8. A circuit according to claim 1, including an integrated circuit which comprises the circuits for switching through and holding the marked switching elements.

* * * * *